US009166457B2

(12) United States Patent
Yamagishi et al.

(10) Patent No.: US 9,166,457 B2
(45) Date of Patent: Oct. 20, 2015

(54) ROTATING APPARATUS HAVING ROTATING ELECTRICAL MACHINE AND REDUCTION DEVICE WITH COMMON ROTATING SHAFT

(75) Inventors: Toshiyuki Yamagishi, Fukuoka (JP); Nobukazu Miyauchi, Fukuoka (JP); Kenji Matsuura, Fukuoka (JP); Toshinao Kato, Shizuoka (JP); Atsushi Oishi, Shizuoka (JP); Toshiki Takahashi, Shizuoka (JP)

(73) Assignees: KABUSHIKI KAISHA YASKAWA DENKI, Kitakyushu-Shi (JP); SANKYO SEISAKUSHO CO., Tokyo (JP)

( * ) Notice: Subject to any disclaimer, the term of this patent is extended or adjusted under 35 U.S.C. 154(b) by 454 days.

(21) Appl. No.: 13/347,699

(22) Filed: Jan. 11, 2012

(65) Prior Publication Data
US 2012/0175982 A1    Jul. 12, 2012

(30) Foreign Application Priority Data

Jan. 11, 2011  (JP) .................................. 2011-003182
Feb. 2, 2011   (JP) .................................. 2011-020474

(51) Int. Cl.
*H02K 7/08*       (2006.01)
*H02K 7/116*      (2006.01)
*F16H 1/16*       (2006.01)
*H02K 11/00*      (2006.01)

(52) U.S. Cl.
CPC .............. *H02K 7/1166* (2013.01); *F16H 1/166* (2013.01); *H02K 7/085* (2013.01); *H02K 11/0031* (2013.01)

(58) Field of Classification Search
CPC .......... H02K 7/08; H02K 7/081; H02K 7/085
USPC ........................ 310/83, 90; 384/517, 518, 519
See application file for complete search history.

(56) References Cited

U.S. PATENT DOCUMENTS 3,738,719 A * 6/1973 Langner ......................... 384/517
5,056,213 A * 10/1991 Behnke et al. ................... 29/596
5,216,307 A   6/1993 Hosoya (Continued)

FOREIGN PATENT DOCUMENTS

CN    101075763    11/2007
JP    03-126545    5/1991

(Continued)

OTHER PUBLICATIONS

Japanese Office Action for corresponding JP Application No. 2011-020474, Sep. 26, 2014.

(Continued)

*Primary Examiner* — Michael Andrews
(74) *Attorney, Agent, or Firm* — Mori & Ward, LLP

(57) ABSTRACT

The disclosure discloses a rotating electrical machine that is integrally formed with a reduction device having an input shaft to which a roller gear cam is provided and an output shaft to which cam followers configured to sequentially engage with the roller gear cam is provided on an outer periphery, extending along a direction orthogonal to the input shaft, and is configured to employ one of a field system or an armature as a rotator and the other of the field system or the armature as a stator, including a rotating shaft that is fixed to the rotator and integrally formed as a single shaft with the input shaft of the reduction device.

5 Claims, 3 Drawing Sheets

(56) References Cited

U.S. PATENT DOCUMENTS

| | | | |
|---|---|---|---|
| 5,560,687 A * | 10/1996 | Hagelthorn | 384/517 |
| 7,960,879 B2 | 6/2011 | Abousleiman et al. | |
| 2002/0189892 A1 * | 12/2002 | Appleyard | 180/444 |
| 2007/0278874 A1 | 12/2007 | Abousleiman et al. | |
| 2010/0320026 A1 | 12/2010 | Yoshida et al. | |
| 2011/0000737 A1 * | 1/2011 | Nagase et al. | 180/444 |

FOREIGN PATENT DOCUMENTS

| | | |
|---|---|---|
| JP | 11-308805 | 11/1999 |
| JP | 2006-349072 | 12/2006 |
| JP | 2009-190476 | 8/2009 |

OTHER PUBLICATIONS

Chinese Office Action for corresponding CN Application No. 201210004760.0, Feb. 25, 2015.

Taiwanese Office Action for corresponding TW Application No. 101101123, Aug. 10, 2015.

* cited by examiner

ROTATING APPARATUS HAVING ROTATING ELECTRICAL MACHINE AND REDUCTION DEVICE WITH COMMON ROTATING SHAFT

CROSS-REFERENCE TO RELATED APPLICATION

The present application claims priority from Japanese Patent Application No. 2011-003182, which was filed on Jan. 11, 2011 and Japanese Patent Application No. 2011-020474, which was filed on Feb. 2, 2011, the disclosure of which is incorporated herein by reference in its entirety.

BACKGROUND OF THE INVENTION

1. Field of the Invention

The present invention relates to a rotating electrical machine used for a drive source of a rotary table device or the like, and a rotating apparatus comprising the rotating electrical machine.

2. Description of the Related Art

In prior art, in the machine tool field, for example, a rotating apparatus comprising a rotating electrical machine and reduction device has been used (see JP, A, 03-126545).

SUMMARY OF THE INVENTION

In order to achieve the object, the aspect of the present invention discloses a rotating electrical machine that is integrally formed with a reduction device comprising an input shaft to which a roller gear cam is provided and an output shaft to which cam followers configured to sequentially engage with the roller gear cam is provided on an outer periphery, extending along a direction orthogonal to the input shaft, and is configured to employ one of a field system or an armature as a rotator and the other of the field system or the armature as a stator, comprising: a rotating shaft that is fixed to the rotator and integrally formed as a single shaft with the input shaft of the reduction device.

In order to achieve the above object, the aspect of the present invention further discloses a rotating apparatus that integrally comprises a rotating electrical machine that employs one of a field system and an armature as a rotator and the other of the field system and the armature as a stator, and a reduction device, wherein: the rotating electrical machine has a rotating shaft that is fixed to the rotator; the reduction device has an input shaft to which a roller gear cam is provided and an output shaft to which cam followers configured to sequentially engage with the roller gear cam is provided on an outer periphery, extending along a direction orthogonal to the input shaft; and the rotating shaft of the rotating electrical machine and the input shaft of the reduction device are integrally formed as a single shaft.

DETAILED DESCRIPTION OF THE EMBODIMENTS

The following describes an embodiment of the disclosure with reference to accompanying drawings.

Figure 1:
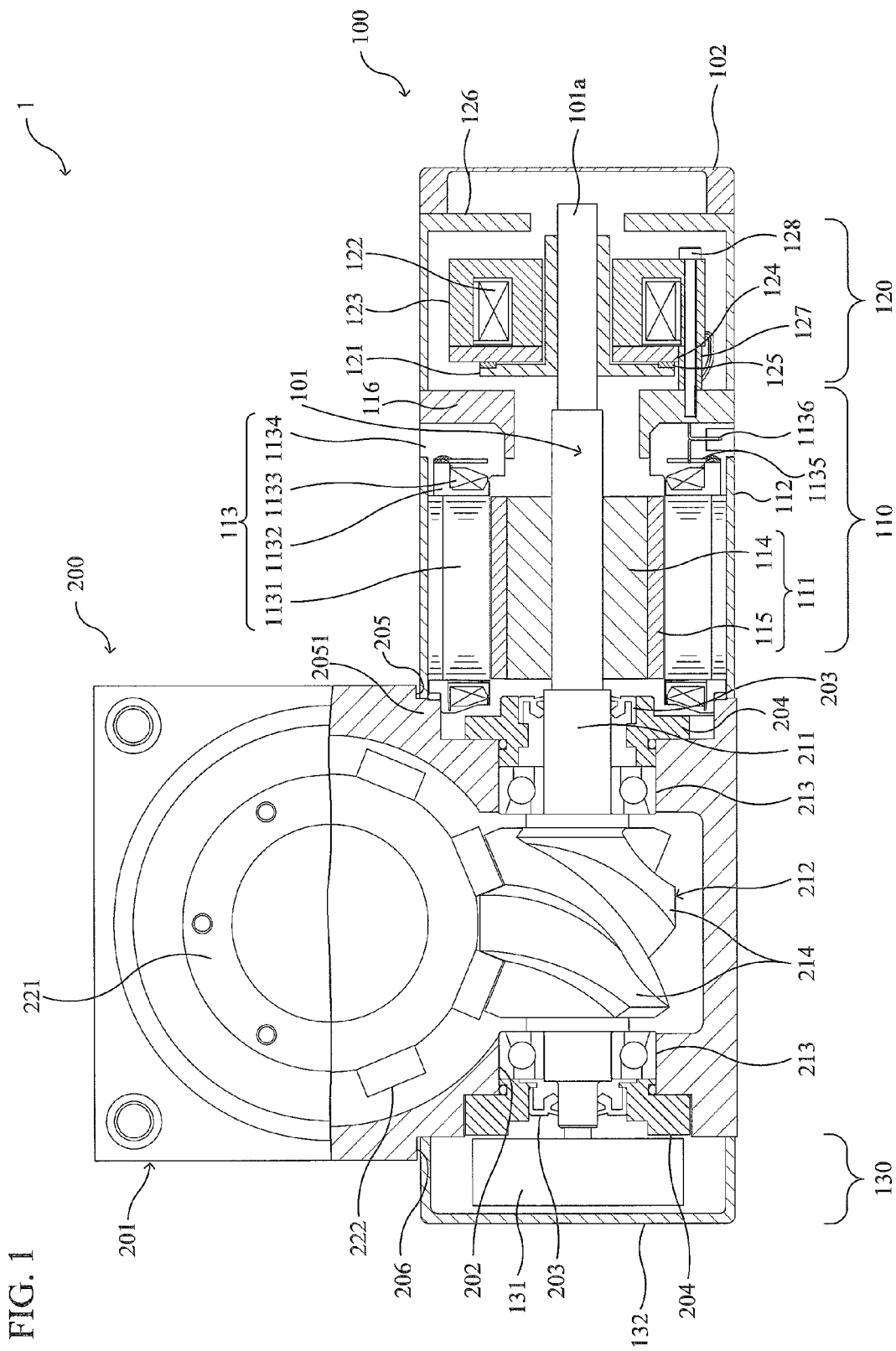
FIG. 1 is a longitudinal sectional view illustrating the overall configuration of a rotating apparatus according to an embodiment of the disclosure.

FIG. 1 is a longitudinal sectional view illustrating the overall configuration of a rotating apparatus according to an embodiment. As shown in FIG. 1, a rotating apparatus 1 integrally comprises a motor 100 as a rotating electrical machine, and a reduction device 200.

First, the motor 100 will be described. The motor 100 comprises a motor electromagnetic portion 110, a brake portion 120, and an encoder portion 130. The motor electromagnetic portion 110 and the brake portion 120 are adjacently disposed. The reduction device 200 is disposed between the motor electromagnetic portion 110 and the encoder portion 130.

The motor electromagnetic portion 110 comprises a rotator 111 and a stator 113. The rotator 111 is fixed so that the shaft core thereof is the same as the shaft core of a rotating shaft 101. The stator 113 is fixed to a motor frame 112 so that it lies opposite the outer peripheral surface of the rotator 111 in the radial direction. The rotating shaft 101 is integrally formed into a single shaft with an input shaft 211 of the reduction device 200. Specifically, a single shaft is machined, forming the rotating shaft 101 so that it has a smaller diameter than the input shaft 211 of the reduction device 200.

The rotator 111 comprises a yoke 114 and a magnet 115. The rotator 111 is inserted from the side of the rotating shaft 101 that is opposite the reduction device 200 (the opposite side of the load; the right side in FIG. 1), and is adhered and fixed to the outer periphery of the rotating shaft 101. The stator 113 comprises a laminated core 1131, a bobbin 1132, a coil wire 1133, a wire connecting substrate 1135 for connecting the coil wire 1133, and an input terminal 1136. The laminated core 1131 is inserted through the fixed bobbin 1132. The coil wire 1133 is wrapped around the bobbin 1132. The input terminal 1136 is connected to the wire connecting substrate 1135. The bobbin 1132 is made of an insulating material such as resin for electrically insulating the laminated core 1131 and the coil wire 1133. The laminated core 1131, the bobbin 1132, the coil wire 1133, the wire connecting substrate 1135, and the input terminal 1136 are molded using a resin 1134. A bracket 116 is provided to the stator 113, on the opposite side of the reduction device 200.

The brake portion 120 is a power-off activated type electromagnetic brake that brakes the rotating shaft 101 on the opposite side of the reduction device 200. The brake portion 120 is disposed adjacent to the motor electromagnetic portion 110, on the opposite side of the reduction device 200. This brake portion 120 comprises a brake disk 121, a field core 123, and an armature 124. The brake disk 121 is fixed to the outer periphery of an end portion 101a of the rotating shaft 101. The field core 123 houses an exciting coil 122 and a spring (not shown). The armature 124 is disposed on the reduction device 200 side (the load side; the left side in FIG. 1) so that it faces the field core 123. The brake portion 120 is fixed to the bracket 116 via a collar 127 by a bolt 128. The brake portion 120 is connected to the input terminal 1136 via a lead wire. Note that the end portion 101a of the rotating shaft 101 is formed by machining, for example, so that it has a smaller diameter than any other section.

The spring housed in the field core 123 activates a biasing force that presses the armature 124 toward the reduction device 200 side. The armature 124 is formed into a discoid by a suitable magnetic material (such as steel, for example). The armature 124 is movably disposed in the axial direction only (horizontal direction in FIG. 1) between the field core 123 and the brake disk 121. A friction material 125 is provided to the surface of the brake disk 121 that is on the opposite side of the reduction device 200.

Each device that constitutes the brake portion 120 is housed inside a brake cover 126. Further, a cover 102 is provided to the brake cover 126, on the opposite side of the reduction device 200.

The operation of the brake portion 120 having a configuration such as the above will now be described.

In a state in which the exciting coil 122 is not energized (=power-off state), braking is performed by the brake portion 120. That is, in a power-off state, the armature 124 is pressed by the spring, causing the armature 124 to move toward the reduction device 200 side and contact the friction material 125. As a result, the brake disk 121 is dampened, braking the rotation of the rotating shaft 101. On the other hand, in a state in which the exciting coil 122 is energized (=power-on state), braking is not performed by the brake portion 120. That is, in a power-on state, the exciting coil 122 exerts a magnetic attractive force on the armature 124, toward the opposite side of the reduction device 200. With this arrangement, the armature 124 resists the biasing force of the spring and moves toward the opposite side of the reduction device 200. As a result, the armature 124 is separated from the friction material 125 and released from the above braking, enabling rotation of the rotating shaft 101.

The encoder portion 130 is disposed opposite the motor electromagnetic portion 110 and the brake portion 120, sandwiching the reduction device 200. The encoder portion 130 comprises an optical or electromagnetic encoder 131 and an encoder cover 132 that covers this encoder 131, for example. The encoder 131 detects the angle of rotation, etc., of the rotating shaft 101.

The motor 100 of a configuration such as the above does not further comprise a bearing that rotatably supports the rotating shaft 101. As described above, the rotating shaft 101 is integrally formed with the input shaft 211 of the reduction device 200. Then, the input shaft 211 of the reduction device 200 is rotatably supported by a bearing 213, thereby supporting the rotating shaft 101 in a cantilever shape. This makes it possible to eliminate the bearing that rotatably supports the rotating shaft 101.

Next, the reduction device 200 will be described. The reduction device 200 is a so-called roller gear reduction device. The reduction device 200 comprises the input shaft 211 and an output shaft 221. A roller gear cam 212 is provided to the input shaft 211. Cam followers 222 that sequentially engage with the roller gear cam 212 are provided to the outer periphery of the output shaft 221.

The input shaft 211 is rotatably supported with respect to a housing 201 by the bearing 213 disposed on both axial sides. The roller gear cam 212 is integrally provided to the input shaft 211. A spiral-shaped taper rib 214 is formed on the roller gear cam 212. Axial displacement is uniformly provided in accordance with the angle of rotation to the taper rib 214. Further, as described above, the input shaft 211 is integrally formed into a single shaft with the rotating shaft 101 of the motor 100.

The output shaft 221 is disposed so that the axial direction thereof is substantially orthogonal to and has a skewed positional relationship with the axial direction of the input shaft 211. The output shaft 221 extends in the direction orthogonal to the input shaft 211. The output shaft 221 is a hollow shaft. The output shaft 221 is rotatably supported with respect to the housing 201 by a bearing (not shown) disposed on both axial sides. A plurality of cam followers 222 is radially provided at a predetermined interval on the outer peripheral surface of the output shaft 221, along the circumferential direction. Two of these cam followers 222 adjacently disposed are sequentially pre-compressed toward and come in contact with both side surfaces of the taper rib 214 in accordance with the rotation of the roller gear cam 212. With this arrangement, the rotation of the input shaft 211 is decelerated and transmitted to the output shaft 221.

The housing 201 comprises a through hole 202 through which the input shaft 211 is inserted. The bearing 213 is provided within the through hole 202. Further, an oil seal 203 and an oil seal holder 204 are provided to both axial ends of the bearings 213 and 213 of the through hole 202. The oil seal holder 204 supports the oil seal 203 and functions as a bearing pre-compressing member which provides pre-compression to the bearing 213. Both axial sides of the through hole 202 are open on the surface of the housing 201. The motor frame 112 is fixed to a predetermined position of an opening 205 on the motor electromagnetic portion 110 side. The encoder cover 132 is fixed to a predetermined position of an opening 206 on the encoder portion 130 side. Further, the housing 201 further comprises a step portion 2051 at the opening 205 on the motor electromagnetic portion 110 side. The inner peripheral surface of this step portion 2051 and the outer peripheral surface of the resin 1134 of the stator 113 are engaged, thereby inlaying and connecting the step portion 2051 and the resin 1134. At this time, the end portion of the motor frame 112 butts against the step portion 2051, playing the role of a butting surface during the inlaying and connecting process. This inlaying and connecting process causes the housing 201 and the stator 113 to be positioned in a predetermined location.

In the rotating apparatus 1 of the embodiment described above, the rotating shaft 101 of the motor 100 and the input shaft 211 of the reduction device 200 are integrally formed as a single shaft. With this arrangement, when the motor 100 is installed to the reduction device 200, the rotator 111, the brake disk 121, and the like are adhered and fixed to the rotating shaft 101 that protrudes in a cantilever shape from the reduction device 200. Then, assembly can be achieved by installing the brake cover 126 and the motor frame 112, on which the stator 113 is installed, to the outer peripheral side thereof. Accordingly, the tasks of centering and connecting the shafts to one another, which were required in a case where the rotating shaft 101 and the input shaft 211 are provided separately, are no longer required. This makes it possible to efficiently perform the assembly work of the rotating apparatus 1. Further, the man-hours required for the assembly work can be reduced. Furthermore, in a case where the rotating shaft 101 of the motor 100 is separate from the input shaft 211 of the reduction device 200, bolt tightening work and the like is required deep within the hollow rotating shaft, for example, decreasing workability. According to the embodiment, assembly is possible by inserting the rotator 111, etc., through the rotating shaft 101 that protrudes in a cantilever shape from the reduction device 200, as described above. This makes it possible to achieve improvement in workability. Furthermore, in a case where the rotating shaft 101 of the motor 100 is separate from the input shaft 211 of the reduction device 200, the rotating shaft 101 is connected by bolts to the input shaft 211 via a connecting member. As a result, there has been a trend to increase the size of the rotating apparatus 1 in order to ensure space for such connecting members and the like. Nevertheless, according to the embodiment, the rotating shaft 101 and the input shaft 211 are integrally formed as a single shaft. Accordingly, connecting members and the like are no longer necessary, making it possible to achieve a reduction in size of the rotating apparatus 1.

In particular, according to the embodiment, the motor 100 does not comprise a bearing that rotatably supports the rotating shaft 101. With this arrangement, the bracket 116 which had required a predetermined thickness for bearing retention can be made thin. Furthermore, the rotating shaft 101 that had required a certain length for bearing retention can be shortened, thereby making it possible to reduce the size of the motor 100 (that is, the rotating apparatus 1). Further, the number of parts required decreases to the extent that the bearing is no longer required. As a result, the advantage of weight and cost reduction of the motor 100 (that is, the rotating apparatus 1) is also achieved.

Note that the present disclosure is not limited to the above-described embodiment, and various modifications may be made without deviating from the spirit and scope of the disclosure. The following describes such modifications in order.

(1) When the Motor does not Comprise a Brake Portion

While the embodiment describes an illustrative scenario in which the motor 100 comprises the brake portion 120, the embodiment of the disclosure may also be applied to a motor that does not comprise the brake portion 120.

Figure 2:
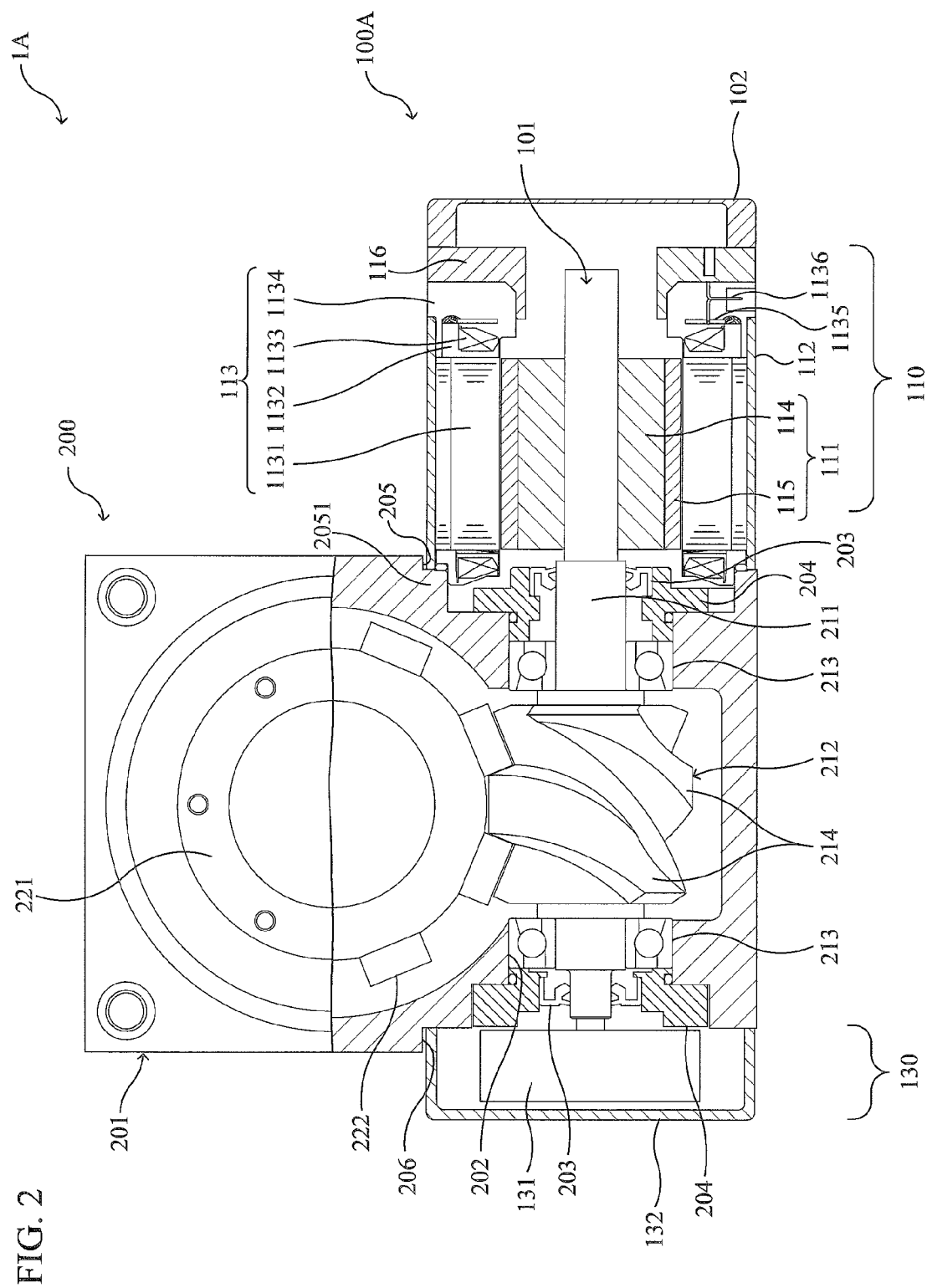
FIG. 2 is a longitudinal sectional view illustrating the overall configuration of the rotating apparatus comprising a motor that does not comprise a brake portion.

FIG. 2 is a longitudinal sectional view illustrating the overall configuration of a rotating apparatus comprising a motor that does not comprise a brake portion 120. As shown in FIG. 2, a rotating apparatus 1A integrally comprises a motor 100A having the motor electromagnetic portion 110 and the encoder portion 130, and the reduction device 200. The motor 100A does not have the brake portion 120; rather, the cover 102 is provided directly to the bracket 116 of the motor electromagnetic portion 110. Other than the motor 100A not having a brake portion 120, the configuration is the same as that in the embodiment. In this modification as well, the same advantages as those of the embodiment are achieved.

(2) When the Outer and Inner Sides of the Oil Seal Holder Comprise a Small Diameter and a Large Diameter, Respectively According to the modification, the outer axial side (encoder portion side) of the oil seal holder on the encoder portion side serves as a screw-engaging portion wherein the screw portion that engages with the housing is formed on an outer periphery. Further, the inner axial side (bearing 213 side) of the oil seal holder on the encoder portion side serves as the pre-compressing portion that contacts the outer ring of the bearing 213. The outer diameter of the pre-compressing portion is configured larger than the outer diameter of the screw-engaging portion.

Figure 3:
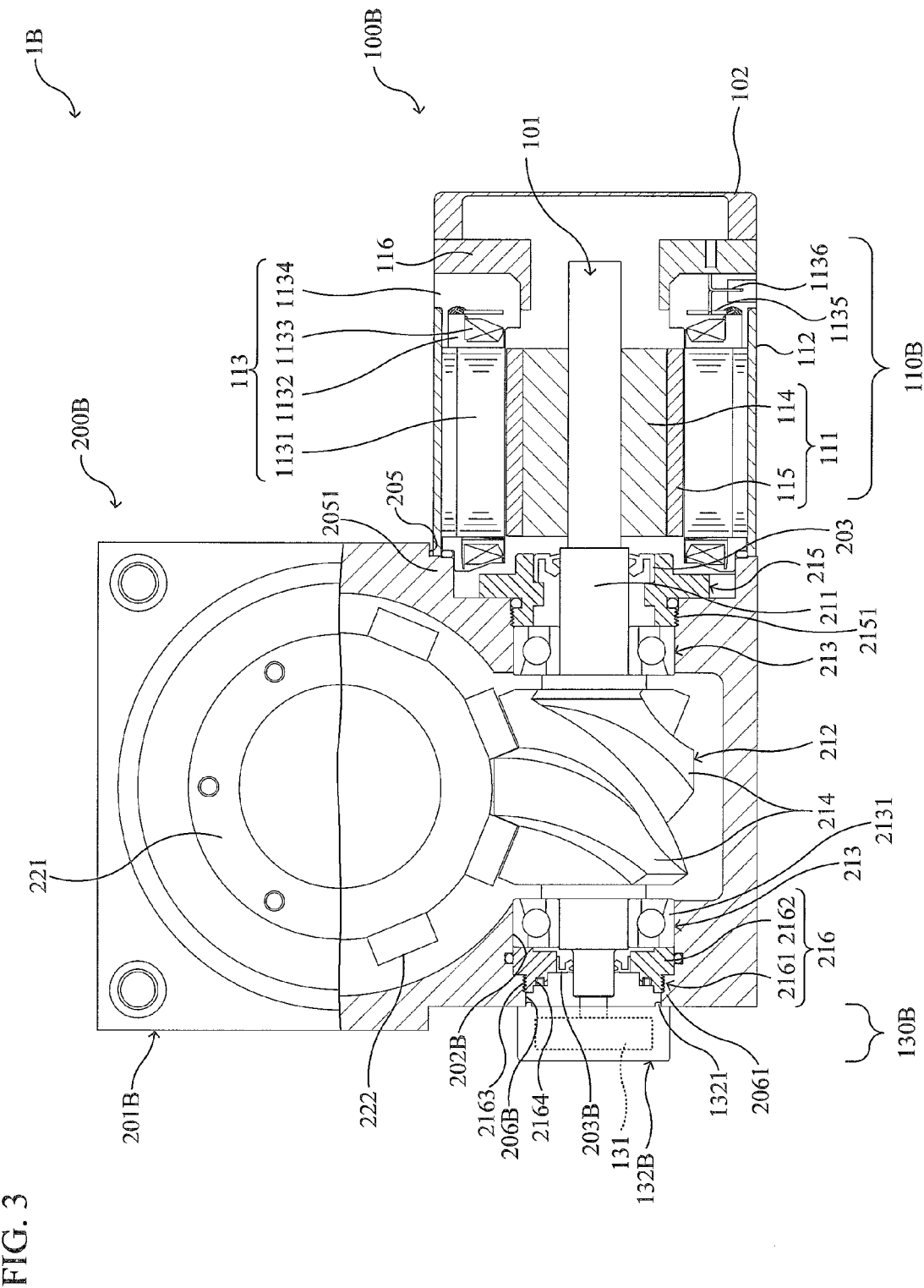
FIG. 3 is a longitudinal sectional view illustrating the overall configuration of the rotating apparatus of a modification wherein the outer side and inner side of the oil seal holder are provided with a small diameter and a large diameter, respectively.

FIG. 3 is a longitudinal sectional view illustrating the overall configuration of a rotating apparatus according to this modification. In FIG. 3, sections that are the same as those in FIG. 1, etc., are given the same reference numerals, and descriptions thereof are suitably omitted. As shown in FIG. 3, a rotating apparatus 1B of this modification comprises a motor with a relatively high capacity and a reduction device, as an example. The rotating apparatus 1B integrally comprises a motor 100B comprising a motor electromagnetic portion 110B and an encoder portion 130B, and a reduction device 200B. That is, the motor 100B, similar to the motor 100A of the modification of (1) above, does not comprise the brake portion 120. Further, according to the motor 100B, the cover 102 is directly provided to the bracket 116 of the motor electromagnetic portion 110B. Note that, similar to the motor 100 of the embodiment, the motor 100B may comprise the brake portion 120.

The configuration of the motor electromagnetic portion 110B is the same as that of the motor electromagnetic portion 110 of the embodiment.

The encoder portion 130B comprises the encoder 131 and an encoder cover 132B that covers the encoder 131. If the motor 100B is a high-capacity motor, a small-sized encoder (the encoder 131 in the embodiment in this example) is sufficient. As a result, the encoder portion 130B is relatively small compared to the motor electromagnetic portion 110B and the reduction device 200B. According to this modification, the outer diameter of the encoder cover 132B is smaller than the outer diameter of the bearing 213. The encoder cover 132B comprises a convex portion 1321 concentrically formed with the input shaft 211 in the section on the outer peripheral side in the diameter direction. This convex portion 1321 is formed protruding toward the inner axial side (the motor electromagnetic portion 110B side; the right side in FIG. 3).

The configuration of the other components of the motor 100B is the same as that of the motor 100 of the embodiment.

The reduction device 200B comprises the input shaft 211, the output shaft 221, a housing 201B, the bearing 213, and oil seal holders 215 and 216.

The housing 201B comprises a through hole 202B through which the input shaft 211 is inserted. The bearing 213 is provided on both axial (horizontal in FIG. 3) sides of the roller gear cam 212 within the through hole 202B. According to the modification, the size of the bearing 213 on the motor electromagnetic portion 110B side (the right side in FIG. 3), and the size of the bearing 213 on the encoder portion 130B side (the left side in FIG. 3) are the same. The oil seal 203 and the oil seal holder 215 are provided to the outer axial side of the bearing 213 on the motor electromagnetic portion 110B side. The oil seal holder 215 supports the oil seal 203 and provides pre-compression to the bearing 213. On the other hand, an oil seal 203B and the oil seal holder 216 are provided to the outer axial side of the bearing 213 on the encoder portion 130B side. The oil seal holder 216 supports the oil seal 203B and provides pre-compression to the bearing 213.

Both axial sides of the through hole 202B are open on the surface of the housing 201B. The motor frame 112 is positioned and fixed to a predetermined location on the opening 205 on the motor electromagnetic portion 110B side. The encoder cover 132B is positioned and fixed to a predetermined location on an opening 206B on the encoder portion 130B side. Further, the housing 201B comprises the step portion 2051 at the opening 205, similar to the housing 201 of the embodiment. Then, the inner peripheral surface of this step portion 2051 and the outer peripheral surface of the resin 1134 of the stator 113 are engaged, inlaying and connecting the step portion 2051 and the resin 1134. This inlaying and connecting process causes the housing 201B and the stator 113 to be positioned in a predetermined location. Further, the encoder portion 130B side of the through hole 202B has a reduced diameter and opens on the surface of the housing 201B. The housing 201B comprises a step portion 2061 at this opening 206B. The inner peripheral surface of this step portion 2061 and the outer peripheral surface of the convex portion 1321 of the encoder cover 132B are engaged, thereby inlaying and connecting the step portion 2061 and the convex portion 1321. At this time, the section of the encoder cover 132B that is further on the outer peripheral side than the convex portion 1321 butts against the step portion 2061, playing the role of a butting surface during the inlaying and connecting process. This inlaying and connecting process causes the encoder cover 132B and the input shaft 211 to be positioned and installed to the housing 201B so that the axis of the encoder cover 132B and the axis of the input shaft 211 align.

The oil seal holder 216 on the encoder portion 130B side comprises a screw-engaging portion 2161 and a pre-compressing portion 2162. The screw-engaging portion 2161 forms a screw portion 2163 on its outer periphery that engages with a screw portion (not shown) formed on the inner periphery of the step portion 2061. The pre-compressing portion 2162 is positioned on the inner axial side from the screw-engaging portion 2161, and contacts the outer ring 2131 of the bearing 213 on the encoder portion 130B side from the outer axial side. Further, the outer diameter of the pre-compressing portion 2162 is larger than the outer diameter of the screw-engaging portion 2161. According to this modification, the outer diameter of the pre-compressing portion 2162 on the inner axial side is substantially the same as the outer diameter of the bearing 213. On the other hand, the outer diameter of the screw-engaging portion 2161 on the outer axial side is smaller than the outer diameter of the bearing 213. With the oil seal holder 216 thus configured, the screw portion 2163 of the screw-engaging portion 2161 is engaged with the screw portion formed on the inner periphery of the step portion 2061 and fixed to the inner peripheral surface of the step portion 2061. At this time, the oil seal holder 216 is fixed so that the pre-compressing portion 2162 contacts the outer ring 2131 of the bearing 213 on the encoder portion 130B side from the outer axial side.

The following describes the work of assembling the oil seal holder 216 and the bearing 213 on the encoder portion 130B side to the housing 201B. That is, the operator who performs assembly engages the screw portion 2163 to the screw portion formed on the inner periphery of the step portion 2061, and installs the oil seal holder 216 to the inner peripheral surface of the step portion 2061 from the inner axial side. Subsequently, the operator installs the outer ring 2131 of the bearing 213 to the inner peripheral surface of the through hole 202B. When adjusting the pre-compression applied to the bearing 213, the operator installs a predetermined jig from the outer axial side to a hole 2164 for jig installation provided to the outer axial side of the oil seal holder 216. Then, the operator rotates the oil seal holder 216 via the jig and adjusts the amount of tightening of the screw portion 2163. In other words, the operator adjusts the pre-compression by pushing and pulling the oil seal holder 216 to the inner axial side and outer axial side, respectively. For example, to increase the pre-compression applied to the bearing 213, the operator rotates the oil seal holder 216 in the direction opposite that during installation to the step portion 2061 using a jig. This decreases the amount of tightening of the screw portion 2163, pushing the oil seal holder 216 toward the inner axial side and increasing the pre-compression. Further, for example, to decrease the pre-compression applied to the bearing 213, the operator rotates the oil seal holder 216 in the same direction as that during installation to the step portion 2061 using a jig. This increases the amount of tightening of the screw portion 2163, pulling the oil seal holder 216 away from the outer axial side and decreasing the pre-compression.

The oil seal holder 215 on the motor electromagnetic portion 110B side is fixed to the inner peripheral surface of the through hole 202 when a screw portion 2151 formed on the outer periphery is engaged with the screw portion (not shown) formed on the inner periphery of the through-hole 202B. At this time, the oil seal holder 215 is fixed so that it contacts the outer ring 2131 of the bearing 213 on the motor electromagnetic portion 110B side from the outer axial side. During the assembly work of the oil seal holder 215, the operator who performs the assembly work installs the outer ring 2131 of the bearing 213 to the inner peripheral surface of the through hole 202B. Subsequently, the operator engages the screw portion 2151 to the screw portion formed on the inner periphery of the through hole 202B, and installs the oil seal holder 215 from the outer axial side to the inner peripheral surface of the through hole 202B.

The configuration of the other components of the reduction device 200B is the same as that of the reduction device 200 of the embodiment.

The advantages achieved by this modification described above will now be described.

As previously described, the oil seal holder that provides pre-compression to the bearing 213 is provided to the outer axial side of the bearing 213. In particular, in the roller gear reduction device, the oil seal holder is generally fixed by engaging the screw portion provided to the outer periphery of the oil seal holder to the screw portion formed on the housing 201B. With this arrangement, the position of the roller gear cam 212 of the input shaft 211 is axially slidable, making it possible to finely adjust the state of contact between the taper rib 214 of the roller gear cam 212 and the cam follower 222 of the output shaft 221. At this time, in general, the configuration employed is the one of this modification wherein the oil seal holder 215 is on the motor electromagnetic portion 110B side. That is, at least the oil seal holder comprising an outer diameter that is greater than or equal to the bearing 213 is connected from the outer side of the housing 201B. Here, the encoder cover 132B needs to be installed to the housing 201B so that it is coaxial with the input shaft 211. At this time, in a case where the oil seal holders on both axial sides have the above configuration, the encoder cover 132B having a diameter that is smaller than the outer diameter of the bearing 213 is positioned and installed to the oil seal holder.

Nevertheless, the oil seal holder is a structure that is screwed into the housing 201B. As a result, the axis of the oil seal holder may shift with respect to the axis of the input shaft 211. Further, the outer ring 2131 of the bearing 213 of the input shaft 211 is supported by the housing 201B. As a result, to ensure the positioning accuracy (concentricity with the input shaft 211) of the encoder cover 132B, the encoder cover 132B needs to be positioned with respect to the housing 201B.

Here, in order to position and install the encoder cover 132B to the housing 201B, the size of the bearing 213 on the encoder portion 130B side may be designed smaller than the size of the bearing 213 on the motor electromagnetic portion 110B side, and the outer diameter of the encoder cover 132B may be designed larger than the outer diameter of the bearing. Nevertheless, in such a case, the size of the bearings on the left and right sides of the reduction device 200B differ, resulting in an unbalanced state and thus a decrease in assembly accuracy and rigidity. Accordingly, the bearing on the encoder portion 130B side requires a size that is equivalent to that on the motor electromagnetic portion 110B side. However, it is also possible to separately provide an encoder installation base to the housing 201B and position the encoder cover 132B to the installation base. Nevertheless, in such a case, the number of components increases, resulting in an increase in size and cost, etc.

With such a background, according to this modification, the oil seal holder 216 on the encoder portion 130B side comprises the screw-engaging portion 2161 and the pre-compressing portion 2162 comprising a larger diameter than the screw-engaging portion 2161. On the outer periphery of the screw-engaging portion 2161 is formed the screw portion 2163 that engages with the housing 201B. The pre-compressing portion 2162 is positioned on the inner axial side from the screw-engaging portion 2161 and contacts the outer ring 2131 of the bearing 213. The screw-engaging portion 2161 on the outer axial side has a smaller diameter than the pre-compressing portion 2162 on the inner axial side, which has substantially the same diameter as the outer diameter of the bearing 213. With this arrangement, positioning and installation can be achieved by directly inlaying and connecting the encoder cover 132B having a smaller diameter than the outer diameter of the bearing 213 to the housing 201B on the outer axial side of the oil seal holder 216. With this arrangement, the size of the bearing 213 on both the left and right sides of the reduction device 200B can be made the same, thereby making it possible to maintain high accuracy and rigidity. Further, without use of an installation base or the like, the encoder cover 132B having a diameter smaller than the outer diameter of the bearing 213 can be accurately and efficiently assembled to the housing 201B.

(3) Other

According to the modification (2), only the oil seal holder 216 on the encoder portion 130B side of the oil seal holders 215 and 216 is configured with an outer axial side having a small diameter and an inner axial side having a large diameter, but the present disclosure is not limited thereto. That is, the oil seal holder 215 on the motor electromagnetic portion 110B side may be similarly configured with a structure wherein the outer axial side has a small diameter and the inner axial side has a large diameter.

Further, according to the above, the motor electromagnetic portions 110 and 110B and the encoder portions 130 and 130B are separately arranged on one side and the other side of the reduction devices 200 and 200B. Nevertheless, the present disclosure is not limited thereto. That is, the embodiment of the disclosure may be applied to a motor having a configuration in which the motor electromagnetic portions 110 and 110B and the encoder portions 130 and 130B are arranged on one side of the reduction devices 200 and 200B (for example, a configuration in which the brake portion 120 and the encoder portion 130 in FIG. 1 are switched). Further, in such a case, a configuration in which the brake portion 120 is arranged on the other side of the reduction devices 200 and 200B, or a configuration in which a brake portion 120 is not arranged is allowed. Furthermore, a configuration in which the motor electromagnetic portions 110 and 110B, the brake portion 120, and the encoder portions 130 and 130B are all arranged on one side of the reduction devices 200 and 200B is also possible. In these modifications as well, the same advantages as those of the embodiment and each of the modifications are achieved.

While the above has described an illustrative scenario in which the motors 100, 100A, and 100B comprise a field system that includes the yoke 114 and the magnet 115 as the rotator, and an armature that includes the bobbin 117, etc., as the stator, the present disclosure is not limited thereto. Conversely, the motor may provide a field system that includes a yoke and a magnet to the motor frame as the stator, and an armature that includes a bobbin, etc., to the rotating shaft as the rotator. In this case as well, the same advantages as those of the embodiment and each of the modifications are achieved.

Further, in addition to the examples described above, the techniques of the above-described embodiment and exemplary modifications may also be suitably combined.

Although other examples are not individually described herein, various changes and modifications can be made without departing from the spirit and scope of the present disclosure.

What is claimed is:

1. A rotating apparatus that integrally comprises a rotating electrical machine having one of a field system and an armature serving as a rotator and the other of the field system and the armature serving as a stator, and a reduction device, wherein:

said rotating electrical machine has a motor frame that houses said rotator on one side of said rotating apparatus;

said reduction device has:
a housing that is arranged on the other side of said rotating apparatus and houses an output shaft to which cam followers are provided on an outer periphery;

said rotating apparatus further comprises a common rotating shaft that is common to both said rotating electrical machine and said reduction device, is integrally formed into a single shaft, and is extended and ranges from said motor frame to said housing along a direction orthogonal to said output shaft, and said rotator is fixed to an outer periphery of said common rotating shaft in said motor frame and a roller gear cam configured to sequentially engage with said cam followers is provided to an outer periphery of said common rotating shaft in said housing, said reduction device comprises:
two bearings that are respectively disposed on either side of said roller gear cam along an axial direction in said housing and rotatably support said common rotating shaft; and two bearing pre-compressing members that are respectively disposed on an outer side from each of said two bearings along the axial direction and respectively provide pre compression to each of said two bearings, and at least one of said two bearing pre-compressing members comprises:
a screw-engaging portion wherein a screw portion that is screwed to said housing is formed on an outer periphery; and a pre-compressing portion that is positioned on an inner side from said screw engaging portion along the axial direction, has a larger diameter than said screw-engaging portion, and contacts an outer ring of said bearing, said rotating electrical machine comprises an encoder cover including a convex portion concentrically formed with said common rotating shaft, said convex portion inlaying an opening of said housing wherein said screw-engaging portion is screwed.

2. The rotating apparatus according to claim 1, further comprising an encoder provided on an end of said common rotating shaft opposite to an end of the common rotating shaft to which said rotating electrical machine is provided, said encoder being configured to detect an angle of rotation of the common rotating shaft.

3. The rotating apparatus according to claim 2, wherein said encoder cover covers the encoder.

4. The rotating apparatus according to claim 3, wherein an outer diameter of said encoder cover is smaller than an outer diameter of said two bearings.

5. The rotating apparatus according to claim 1, wherein an outer diameter of said encoder cover is smaller than an outer diameter of said two bearings.

* * * * *